June 15, 1971  E. L. GALLE  3,585,049
PROCESS FOR PASTEURIZING FLOUR
Filed Oct. 20, 1969  2 Sheets-Sheet 1

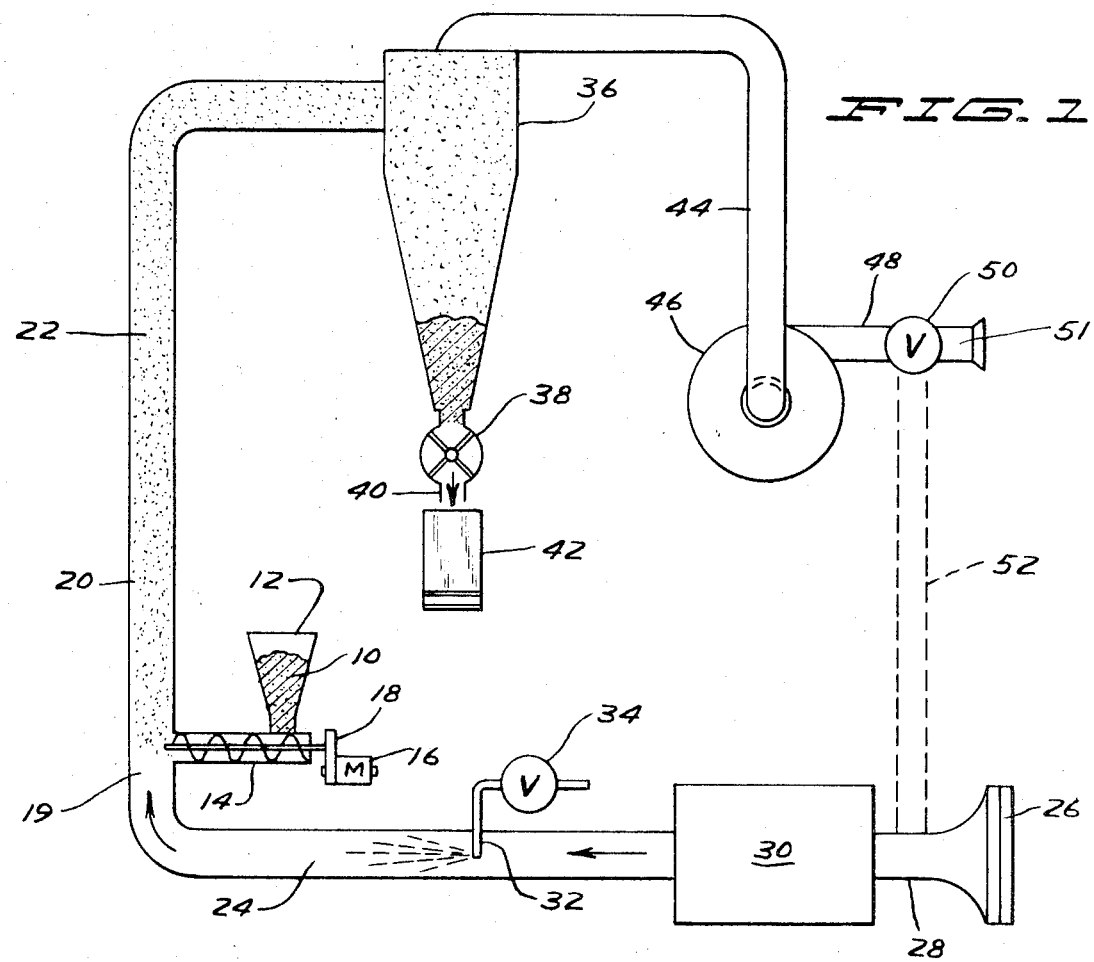

FIG. 1

PROVIDE HEATING MEDIUM

EXPOSE FLOUR TO HEATING MEDIUM UNTIL FLOUR TEMPERATURE IS BETWEEN ABOUT 130°F & 180°F.

SEPARATE FLOUR FROM HEATING MEDIUM

PACK FLOUR WHILE AT A TEMPERATURE OF AT LEAST 130°F.

ALLOW THE PACKED FLOUR TO COOL UNTIL A TEMPERATURE OF ABOUT 120°F IS REACHED IN NOT LESS THAN 12 HOURS

FIG. 2

INVENTOR.
EDWARD L. GALLE
BY James V. Harmon
ATTORNEY

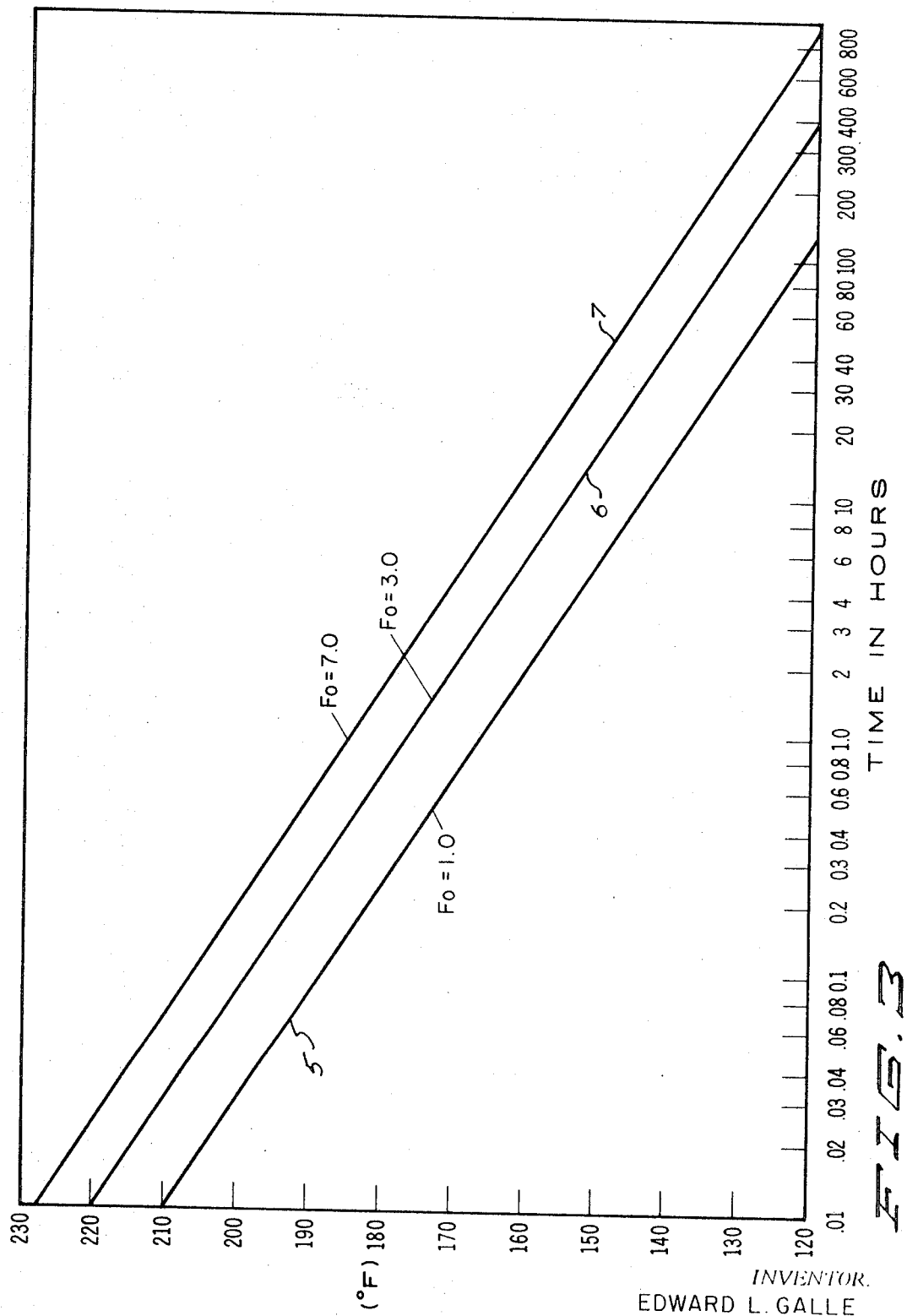

United States Patent Office 3,585,049
Patented June 15, 1971

3,585,049
PROCESS FOR PASTEURIZING FLOUR
Edward L. Galle, St. Paul, Minn., assignor to The
Pillsbury Company, Minneapolis, Minn.
Continuation-in-part of abandoned application Ser. No.
596,674, Nov. 23, 1966. This application Oct. 20, 1969,
Ser. No. 871,422
Int. Cl. A21d 6/00
U.S. Cl. 99—215                                                          4 Claims

ABSTRACT OF THE DISCLOSURE

Flour is pasteurized without sufficient protein denaturation to affect baking qualities by heating the flour to an elevated temperature of at least about 120° F., the heated flour in sealed containers and allowing the containers to cool naturally during their storage period within a storage warehouse such that the cooling conditions and temperature result in a total lethal dosage (L) of 1 to 7.

---

This is a continuation-in-part of my prior application Ser. No. 596,674, filed Nov. 23, 1966, under the same title now abandoned.

The present invention relates to the treatment and preservation of food products and more particularly it provides an improved process and apparatus for pasteurizing flour with virtually no adverse effect upon the baking and eating properties of the baked goods prepared from the treated flour.

Prior systems proposed for pasteurizing flour have had numerous shortcomings. For example, it was found in the course of the work leading to the present invention that the higher temperatures and pressures required in the process proposed by Japikse in Pat. No. 3,159,493 produced an undersiable degree of protein denaturation for most baking purposes. In the course of this work, wheat flour was subjected to steam treatment under conditions similar to those described in the Japikse patent. Specificially, soft wheat flour was treated with steam at 5 and 10 pounds per square inch for 12 seconds. It was found that the control batch of untreated flour had a baked bread volume of 680 cc. The product treated at 5 p.s.i. had a volume of only 470 cc. while that treated at 10 p.s.i. had a baked volume of only 292 cc. Pie scores carried out in the usual way dropped from a control value of 64 to 57 and 48 for 5 and 10 p.s.i. respectively. The bread loaf scores dropped from 82 to 46 and 21 respectively for 5 and 10 p.s.i. treatment. The degree of protein denaturation was shown by extensograph values which dropped from a control value of 177 to 83 and 54 respectively. Since the Japikse reference suggests using even longer treatment times than 12 seconds, there would naturally be greater protein damage than resulted from the above treatment conditions. From these tests it was concluded that the Japikse process would not be suitable for flour used in pie crust or bread baking.

The Fisher et al Pat. No. 1,727,429 describes the treatment of flour in hot humid air at a sufficient temperature to raise the flour within approximate limits of 130° and 180° F. for 10 minutes and thereafter conveying the flour to a second machine where it is cooled for example by blowing humidified air through it.

This process has inherent shortcomings, the primary ones being the introduction of airborne bacteria during the cooling operation which will, of course, recontaminate the flour, the exposure of the treated flour to contaminated processing equipment and the inability of the process to achieve effective microorganism destruction. If it is assumed for example that treatment is carried out in accordance with the Fisher process at the maximum temperature value, 180° F., for a period of 10 minutes, it can be shown using the formulas presented herein and the curves determined in accordance with the present invention that only 67% of the required thermal treatment is achieved by the Fisher process.

The invention has among its objects the following:

(a) the ability to effectively pasteurize flour, e.g., to provide a presumptive coliform count of less than 10 without adversely affecting the baking properties of the flour for use in bread and pie baking applications among others, (b) the ability to achieve effective pasteurization without producing any adverse affect upon color, taste or moisture level, (c) the provision of a process in which no recontamination of the flour can occur after treatment.

These and other objects of the invention will be apparent in view of the accompanying drawings wherein:

FIG. 1 is a schematic diagram of one form of apparatus employed in pasteurizing flour in accordance with the invention.

FIG. 2 is a flow chart describing the steps performed in accordance with a preferred form of the invention, and FIG. 3 is a graph illustrating the thermal death curves found in work leading to the development of the invention in which it is assumed the product is held at a constant temperature for a specified time in hours.

Briefly, flour is pasteurized in accordance with the invention thereby reducing the coliform count in a preferred form of the invention to a presumptive count of less than 10 without sufficient protein denaturation to affect baking qualities by heating the flour until it has reached a temperature of at least about 120° F., thereafter packing the heated flour while in a heated condition in sealed containers and allowing it to cool during its normal storage period in a storage warehouse or during shipment such that the lethal dosage value (L) is between 1 and 7 and preferably between 1 and 3.

When applied to containers of a practical size, e.g., 10 pound or 100 pound bags, it is preferred to heat the flour to a temperature not exceeding about 180° F., fill the bags with the heated flour, seal them and allow them to cool naturally during their normal period of storage or shipment. I have found that effective pasteurization (that bringing the coliform count to a presumptive value of less than 10) can be achieved in accordance with the invention by heating the flour to about 160° F. for 100 pound bags in which case it will normally cool down to about 120° F. in about 10 to 30 hours. For smaller containers, e.g., 10 pound bags, I prefer to heat the flour to as much as 200° F., seal the flour in the bags and allow it to cool as before during its normal period of storage or shipment, and in this case it will cool to about 120° F. in about 2 to 3 hours. In any event, in the practical application of the process it is preferred not to heat the flour substantially above 200° F. since even a short period of storage at or near this temperature during the first cooling phase of the flour is sufficient to raise the (L) close to or above 7 which will render it unsuitable for all baking applications.

For a complete understanding of the present invention, a computation of what is known as the lethal dosage value (L) utilized in the present invention will now be described by reference to FIG. 3.

The lethal dosage value (L) is computed by a method used for many years in the canning industry to calculate the necessary temperatures and times required to kill microorganisms, i.e., for determining the time required to cause the death of a specific type of organism in a given substance at a given temperature or the temperature necessary to kill the organism if the time is given. The formulas used herein are those presented in a publication of the American Can Company, Calculations of Processes for Canned Foods, Research and Technical Department, Maywood, Illinois 1952, page 3, Graphical Methods by Bigelow. The method described in this reference is based upon the experimentally determined fact that the time required to obtain a given thermal kill is an exponential function of the temperature. Since viability of organisms is different in different substrates, the test must be conducted for each type of substance used. In work conducted in the development of the present invention, heat treatments of flour samples at temperatures of 120° F., 140° F., 160° F. and 180° F. for times of 1, 2, 4, 8, 16, 32, 64, 128, and 256 hours were used. The effectiveness of the treatment was determined by taking the presumptive coliform count which indicates the presence of pathogenic organisms. A plate count of less than 10 presumptive coliforms indicates that none were found. However, where the total bacteria count indicates that the product is not sterile and since the sample is only 0.1 gram, the presumptive coliform count can only safely be reported as less than 10 rather than 0. In this particular test with flour, presumptive coliform counts of less than 10 were obtained at above 2 hours in the case of flour with a normal moisture content when stored at a constant temperature of 160° F., 16 hours at 140° F., and 128 hours at 120° F. These points were plotted on semi-logarithmic paper and formed a straight line thus confirming the validity of the method. The plotted line 5 of FIG. 3 establishes the treatment required for a lethal dosage factor ($F_0$) of 1.0. This means that any treatment below the line will have a lethal dosage of less than 1.0 and cannot be expected to result in a presumptive coliform count of less than 10. Any treatment at or above the line 5 should result in a presumptive coliform count of less than 10. As mentioned above, FIG. 3 represents storage for a given period of time at a constant temperature.

Using the treatment from the graph of 1 hour at 167° F. resulting in a lethal dosage of 1.0, it is possible to obtain a formula based upon the slope of the line which is as follows:

$$F_o = 10\left(\frac{T-167}{22}\right)$$
$$L = F_0 \times t$$

where $F_0$=Lethal dosage factor at temperature T
T=Product temperature
L=Total lethal dosage
t=Time in hours In addition to evaluating the finished flour from the standpoint of the content of pathogenic microorganisms, it was also evaluated for baking characteristics. It was discovered that the baking characteristics were normal when the L value was between about 1.0 and 3.0. However, when the L was more than 7, it could not be used for any baking purposes because of extensive protein denaturation. In summary then, the L of the finished flour can be between 1 and 7 in accordance with the invention but is preferably between 1 and 3 if the flour is to be used for bread baking purposes. These observations were surprising indeed since there is no indication in the literature insofar as I am aware to indicate that baking properties of a flour are related to the thermal death curves for bacterial destruction. Notwithstanding, it was discovered that they are not only related but follow generally the same slope. The bread baking limit in which L is greater than 3.0 is based on a maximum of 10% loss in bread score from an untreated sample. The upper baking limit is based upon a 10% loss in pie crust score, since pie crust baking is one of the least sensitive to thermal damage of flour.

It was discovered, however, that $F_0$ is not the only factor involved in evaluating the suitability of the treated flour since high temperatures, e.g., those above 200° F. for example, require rather rapid cooling in order to prevent protein denaturation and maintain the L within the required limits. Cooling of this kind introduces the possibility of recontamination of the flour by exposure to processing equipment or gases at a relatively low temperature. It was discovered that these problems could be totally eliminated by avoiding the cooling step previously used and transferring the hot flour while still at an elevated temperature into storage containers, sealing the storage containers and allowing them to cool naturally during their normal storage period. This not only permits relatively low and controllable temperatures to be used for the highest temperature that the flour reaches, it also makes unnecessary the cooling equipment thereby reducing processing costs and totally prevents the possibility of recontamination of the product. Moreover, the heat of the flour in the sealed storage containers is highly effective in lowering the bacterial count on the inside surface of the shipping container in the event the container is not sterilized before the flour is packed.

After the shipping containers have been filled and stored, the temperature of the product will fall rapidly at first and then at a slower rate. The L for the treatment is calculated by measuring the temperature within the shipping containers several times during the cooling period to obtain a cooling curve. The area beneath this cooling curve is then calculated and from this can be computed the L value.

Thus for example a 100 pound shipping sack filled with flour at about 160° F. will cool to about 120° F. if it is stored in a warehouse at about a temperature of about 70° F. in a period of about 7–40 hrs. The L in this case will be between 1.0 and 3.0.

The preferred processing equipment for heating and packing the flour will now be described. It was found that the flour could be heated by exposing it to heated humidified air in a pneumatic conveyor. While the precise method of heating the flour is not considered critical, the best results were obtained with hot gas contact heating. It was discovered in the course of this work that by suspending the flour in heated air it was possible to provide a uniform temperature throughout the entire mass of the treated flour. It was also discovered that by packing the flour at an elevated temperature and allowing it to cool at a predetermined rate, pasteurization could be accomplished without damaging side effects. Thus, while physicochemical changes occurred in the flour treated by prior methods of pasteurizing flour of which I am aware, in the process according to the invention, very little or no baking quality loss could be detected. Both color and taste were satisfactory and almost no protein denaturation or moisture loss took place. In a typical batch of flour treated in accordance with the invention, the bacteria count as measured by the presumptive coliform test was reduced to less than 10 per gram without impairing the baking qualities of the flour. The total bacteria count was always reduced to less than 1,000 per gram and was usually on the order of 200 per gram. Moreover, the flour was successfully pasteurized with none of the above mentioned undesirable side effects being produced. The flour processed in accordance with the invention not only had good baking qualities, color and taste but also had a presumptive coliform count consistently less than 10 per gram.

A preferred form of the invention will now be described by reference to FIGS. 1 and 2. As can be seen in FIG. 1, the flour 10 that is to be pasteurized is introduced into the apparatus through a hopper 12. Material stored within the hopper 12 passes downwardly into an auger 14 which is operated by suitable driving means such as a motor 16 acting through speed reducer 18. Flour passing through the auger from right to left as seen in FIG. 1 is introduced to a heating medium 19 comprising heated air within a duct 20. The flour particles introduced through the auger thus become uniformly and evenly distributed as shown at 22 within a column of heated rising air 19 within the duct 20. The heated air is introduced through an inlet duct 24. The air being introduced passes first through a suitable air filter 26 for the purpose of removing entrained dust. It then passes through a duct 28 into a suitable heater such as a gas fired heater 30. The hot air at this point has a temperature between about 300° F. and 500° F. A small amount of moisture is preferably added to the air at this point. This can be conveniently accomplished by introducing steam through a pipe 32. The volume of steam being introduced is controlled by a valve 34. While the amount of steam or moisture introduced is not considered critical, it is usually desirable to add moisture to the heating medium for the prevention of moisture loss in the flour being treated. Maintaining the moisture level in duct 44 at a relative humidity of over 80% was found satisfactory.

The rising column of flour particles within the duct 20 passes upwardly into a suitable collecting device such as cyclone 36 having a star valve 38 at its lower end and an outlet duct 40 which feeds the collected heated flour into shipping sacks or other relatively small storage containers 42. Containers having porous walls of less than 300 lb. capacity and preferably less than 200 lb. capacity are preferred. The temperature of the flour 22 at the point it is collected at the outlet duct 40 should be between about 120° F.–200° F. and preferably between 150° F. and 180° F.

As can be seen in FIG. 1, the air is exhausted from the cyclone 36 through an outlet line 44 connected to the inlet of a centrifugal blower 46. The outlet of the blower 46 communicates through duct 48 with a valve 50 which can be used to expel the hot exhaust gas through an outlet duct 51. If desired, the exhausted gases can be recycled through a return line 52 to the inlet duct 28. When the duct 52 is used, economies can be effected by the recovery of heat.

The shipping sacks after being filled are closed in any conventional manner as by sewing the ends shut. They are then placed in a controlled temperature storage room and are allowed to cool naturally. They usually cool to a temperature of 120° F. in from 7 to 40 hours. It is preferred that the storage warehouse be maintained at a temperature of at least about 60° F. to prevent too rapid cooling of the flour. The shipping sacks are preferably stored on pallets in groups of about 15. There is at least some air space between the adjacent pallets. In this way, air will pass between the pallets allowing them to cool at a uniform rate.

It was found that when an initial flour temperature of about 180° F.–200° F. is not exceeded, the L can be controlled and flour quality will not be substantially impaired. Moreover, taste, color and flavor is satisfactory. It was also found that no objectionable amount of moisture condensation took place when the flour was packaged while hot in individual shipping containers such as paper bags which permit the transmission of moisture vapor. Furthermore, the cooling rate of the stored flour could be controlled and it was possible to cool the flour at a relatively more rapid rate than is possible in a large storage bin. It was also discovered that when the flour is allowed to cool in shipping sacks, the entire mass of flour can be cooled at a fairly uniform rate. As the flour cools, its temperature drops at a relatively rapid rate at first. As ambient temperature is approached, it cools more slowly.

The invention will be better understood by reference to Examples I–IV which are set forth in the accompanying Table I. The flour in each example was pasteurized in an apparatus of the type illustrated in FIG. 1.

As can be seen in the table, the presumptive coliform count has been reduced to less than ten from original values of from 50 to 750 per gram. The total bacteria count has been reduced to less than 200 per gram. At the same time, volume and bake scores have been affected only slightly.

TABLE I.—FLOURS PASTEURIZED WITH HOT STORAGE AT 15 SACKS PER PALLET

| Flour, unbleached | (I) Flour from Springfield, Ill. | (II) Flour from Ogden, Utah | (III) Flour from Louisville, Ky. | (IV) Malted and bromated flour from Minneapolis, Minn. |
|---|---|---|---|---|
| Flour: | | | | |
| Feed rate, lb./min | 34 | 34 | 34 | 32. |
| Inlet temperature, °F | 83 to 88 | 74 to 80 | 69 to 73 | 83. |
| Outlet temperature, °F | 159 to 160 | 160 to 162 | 159 to 160 | 152 to 153. |
| Retention time, seconds | 0.467 to 0.506 | 0.483 to 0.53 | 0.483 to 0.53 | 0.565 to 0.60. |
| Cooling time to less than 120° F.: | | | | |
| Maximum, hours | 38 | 33½ | 21 | 24. |
| Minimum, hours | 11½ | 7½ | 7 | 8½. |
| Air: | | | | |
| Initial temp. (Duct 19), °F | 374 | 385 | 380 | 408. |
| Dry bulb (Duct 44), °F | 161 | 163 | 162 | 153. |
| Wet bulb (Duct 44), °F | 154 | 155 | 155 | 151. |
| Flow, c.f.m | 475 to 525 | 455 to 495 | 455 to 495 | 400 to 425. |
| Velocity, f.p.m | 5700 to 6300 | 5450 to 5950 | 5450 to 5950 | 4800 to 5100. |
| Air and flour mixture temp., °F | 162 to 164 | 163 to 165 | 162 to 164 | 153 to 154. |

| Analysis | Control | Pasteurized | Control | Pasteurized | Control | Pasteurized | Control | Pasteurized |
|---|---|---|---|---|---|---|---|---|
| Total bacteria, count/gram | 6475 | 45 | 390 | 160 | 1930 | 135 | 4920 | 200 |
| Presumptive coliforms, count/gram | 750 | <10 | 50 | <10 | 580 | <10 | 360 | <10 |
| Moisture, percent | 11.80 | 11.35 | 11.50 | 10.35 | 10.71 | 10.92 | 12.58 | 11.87 |
| Fat at 14% moisture, percent | 1.15 | 0.94 | 1.13 | 1.10 | 0.90 | 0.90 | 0.81 | 0.87 |
| Maltose at 14% moisture, percent | 113 | 95 | 137 | 140 | 95 | 97 | 380 | 309 |
| Alkaline water ret. const | 51.49 | 55.92 | 59.6 | 63.84 | 55.98 | 57.81 | 71.63 | 75.01 |
| Hunter color: | | | | | | | | |
| Rd | 94.47 | 93.76 | 95.75 | 96.31 | 94.10 | 94.00 | 94.43 | 92.85 |
| a | −0.05 | −0.54 | −0.00 | −0.20 | −0.23 | −0.41 | −0.15 | −0.22 |
| b | 7.47 | 7.59 | 6.40 | 6.18 | 6.83 | 7.09 | 6.32 | 6.98 |
| Farinograph: | | | | | | | | |
| Absorption, percent | 44.1 | 54.4 | 54.8 | 55.2 | 51.5 | 53.3 | 62.9 | 63.7 |
| Valorimeter, percent | 40 | 38 | 27 | 27 | 42 | 42 | 68 | 73 |
| Extensograph: | | | | | | | | |
| Area | 50.4 | 50.8 | 40.0 | 51.2 | 63.0 | 47.3 | 86.0 | 84.7 |
| Extensibility | 201 | 163 | 195 | 155 | 170 | 146 | 221 | 188 |
| Resistance | 140 | 185 | 110 | 200 | 220 | 200 | 155 | 190 |
| Bread bake: | | | | | | | | |
| Volume, cc | 648 | 607 | 605 | 551 | 652 | 608 | 825 | 752 |
| Score | 78 | 70 | 72 | 62 | 78 | 70 | 96 | 87 |
| Pie crust score | 63 | 61 | 66 | 63 | 62 | 61 | [1] Good | [1] Fair |

[1] Pizza crusts.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A process for pasteurizing flour without sufficient protein denaturation to affect baking qualities comprising heating the flour until it has reached a temperature of at least 130° F., packing the heated flour while at an elevated temperature in sealed containers and allowing the flour to cool within the containers during their normal storage period within a storage warehouse or during shipment, said initial temperature and cooling rate being such that the thermal death value (L) of the finished flour is between 1 and 7.

2. The process of claim 1 wherein the heating of said flour is accomplished by exposing the flour to heated moisturized air.

3. The process of claim 1 wherein the flour is heated by suspending the flour in a column of heated moisturized air, collecting the flour and separating the flour from said heated moisturized air and thereafter packing the flour within the sealed containers.

4. A process for pasteurizing flour and thereby reducing the presumptive coliform count to less than 10 without sufficient protein denaturation to destroy the baking qualities of the flour comprising exposing the flour to a heated moisturized atmosphere sufficiently warm to heat the flour until it has reached a temperature of at least 130° F., separating the flour from the heated atmosphere and while the flour is in a heated condition packing the flour in shipping containers, sealing the shipping containers and allowing the flour therein to cool during the normal storage period of the flour within the shipping containers within a storage warehouse or during shipment, the conditions of temperature and storage being such that the thermal death value (L) of the finished flour is between 1 and 3.

References Cited

UNITED STATES PATENTS 1,727,429   9/1929   Fisher et al. _____ 99—93

LIONEL M. SHAPIRO, Primary Examiner

J. R. HOFFMAN, Assistant Examiner